US007113515B2

(12) United States Patent
Hoffman

(10) Patent No.: US 7,113,515 B2
(45) Date of Patent: Sep. 26, 2006

(54) SIGNALING METHOD FOR TRANSMITTING WORKING DATA OVER DIFFERENT TYPES OF DATA TRANSMISSION NETWORKS

(75) Inventor: Klaus Hoffman, München (DE)

(73) Assignee: Siemens Atkiengesellschaft, Munich (DE)

( * ) Notice: Subject to any disclaimer, the term of this patent is extended or adjusted under 35 U.S.C. 154(b) by 783 days.

(21) Appl. No.: 10/242,662

(22) Filed: Sep. 13, 2002

(65) Prior Publication Data

US 2003/0076820 A1  Apr. 24, 2003

(30) Foreign Application Priority Data

Sep. 14, 2001  (EP)  ................................. 01122114

(51) Int. Cl.
*H04L 12/56* (2006.01)
(52) U.S. Cl. .................................................. 370/401
(58) Field of Classification Search ................ 370/353, 370/354, 328, 338, 400–401
See application file for complete search history.

(56) References Cited

U.S. PATENT DOCUMENTS

| | | | | |
|---|---|---|---|---|
| 6,434,140 | B1 * | 8/2002 | Barany et al. | 370/352 |
| 6,515,997 | B1 * | 2/2003 | Feltner et al. | 370/401 |
| 6,539,029 | B1 * | 3/2003 | Toivanen | 370/466 |
| 6,724,752 | B1 * | 4/2004 | Turtiainen et al. | 370/352 |
| 6,765,903 | B1 * | 7/2004 | Allen et al. | 370/356 |
| 6,765,912 | B1 * | 7/2004 | Vuong | 370/395.2 |
| 6,782,004 | B1 * | 8/2004 | Brusilovsky et al. | 370/467 |
| 6,816,482 | B1 * | 11/2004 | Crutcher et al. | 370/352 |
| 6,819,678 | B1 * | 11/2004 | Sylvain | 370/466 |
| 6,842,447 | B1 * | 1/2005 | Cannon | 370/352 |
| 6,870,827 | B1 * | 3/2005 | Voit et al. | 370/352 |
| 6,876,646 | B1 * | 4/2005 | Dore et al. | 370/352 |

OTHER PUBLICATIONS

Draft Amendment to Recommendation Q.765.5 for Bearer Independent Call Control Capability Set 2, Feb. 2001.*
R.R. Knight et al, "Bearer-Independent Call Control," *BT Technol. J.*, vol. 19, No. 2 pp. 77-88, Apr. 2001.
"Annex C to Recommendation H.246," pp. 1-77, Feb. 2000, XP-002189949.
"Call Signalling Protocols and Media Stream Packetization for Packet-Based Multimedia Communication Systems," *ITU-T Recommendation H.225.0*, International Telecommunication Union, pp. 13-65, Sep. 1999.

* cited by examiner

*Primary Examiner*—Zarni Maung
*Assistant Examiner*—Van Nguyen
(74) *Attorney, Agent, or Firm*—Morrison & Foerster LLP

(57) ABSTRACT

Among other things, a signaling method is explained in which working data is transmitted between a circuit-switched data transmission network and a data packet transmission network. A signaling message (400) is established and transmitted, which clearly signals that a terminal of a data packet transmission network is involved in the data transmission.

14 Claims, 3 Drawing Sheets

Figure 1:
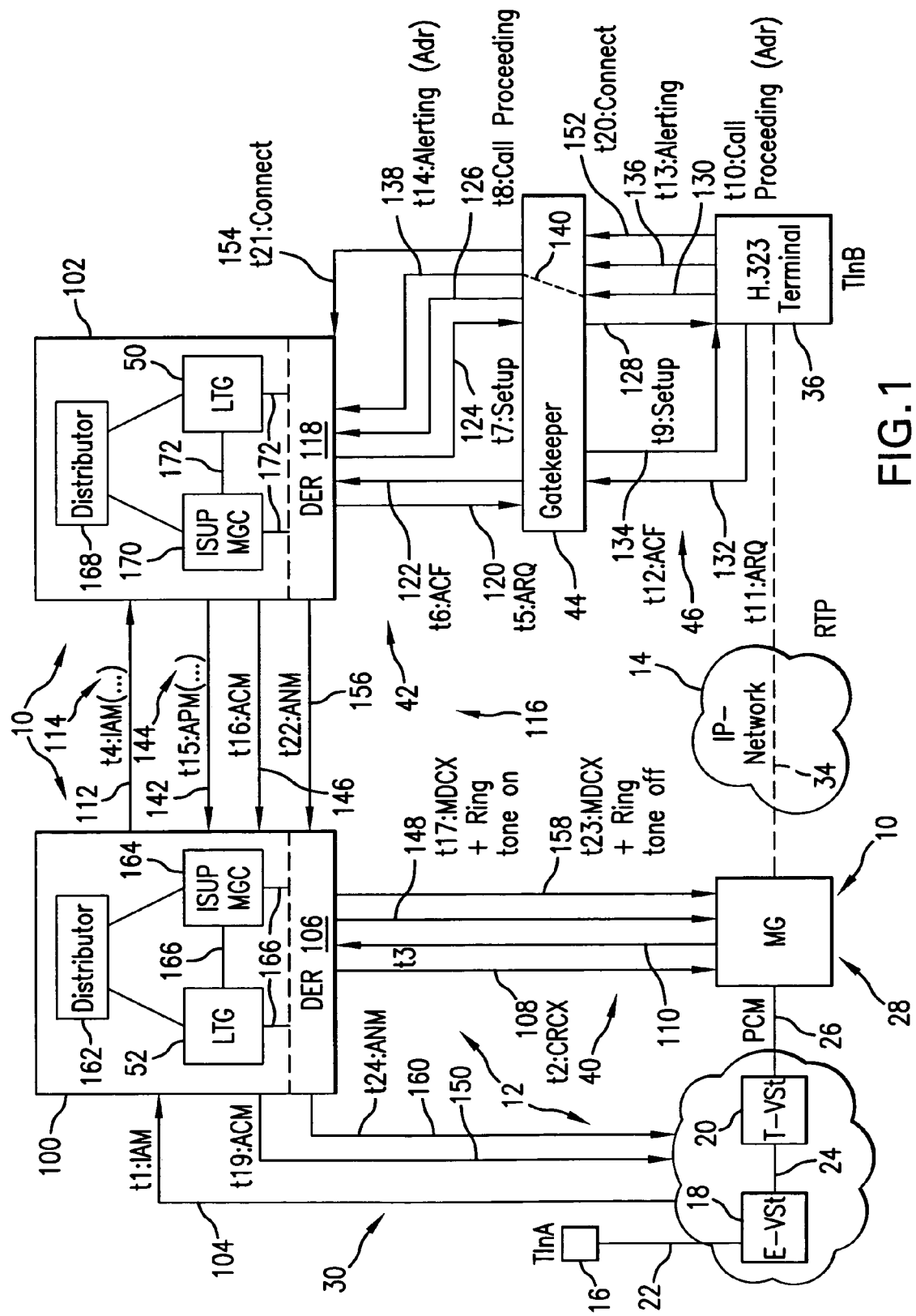

SIGNALING METHOD FOR TRANSMITTING WORKING DATA OVER DIFFERENT TYPES OF DATA TRANSMISSION NETWORKS

The invention relates to a signaling method in which working data is transmitted between a circuit-switched data transmission network and a data packet transmission network.

The circuit-switched data transmission network is a telecommunications network, for example, in which the working data is forwarded in time channels, according to a time multiplex method, for example in time channels of a PCM system (Pulse Code Modulation). Such a network is, for example, the telephone network of Deutsche Telekom AG. The terminal may be an ISDN (Integrated Services Digital Network) telephone, an analog telephone or a video telephone.

The data transmission network may be the Internet or another data transmission network that works according to the Internet protocol. However, other data packet transmission networks are also used, for example the ATM (Asynchronous Transfer Mode) network. In an ATM network, the data packets are also referred to as cells. The data packets or cells contain guidance data that is used to forward the working data contained in the data packets. In data packet transmission networks, there is a connection only on higher protocol levels. On lower protocol levels, on the other hand, the data packets are transmitted without a connection.

It is the task of the invention to indicate a simple signaling method for transmitting working data over different types of data transmission networks. In addition, a related signaling unit and a related program are to be indicated.

The task related to the signaling method is accomplished by means of the process steps indicated in claim 1. Further developments are indicated in the dependent claims.

The invention proceeds from the idea that originally a signaling method for circuit-switched data transmission networks was established for data transmission in a circuit-switched data transmission network. With the creation of data packet transmission networks, signaling methods for data packet transmission networks were established. While the signaling methods for data packet transmission networks were based on the signaling method of a circuit-switched data transmission network, the two signaling methods have developed separately since then. In the case of data transmissions in which the data is transmitted in both types of networks, however, signaling elements that are common to the two signaling methods are necessary.

In the method according to the invention, a signaling message is therefore established and transmitted, which clearly signals that a terminal of a data packet transmission network [is involved in] the data transmission. This signaling message is sent before transmission of the working data. Depending on the content or the occurrence of the signaling message, the transmission of data between the circuit-switched data transmission network and the data packet transmission network is differentiated from other data transmissions; e.g., from data transmissions exclusively in the circuit-switched data transmission network or from data transmissions exclusively in the data packet transmission network.

Depending on the result of the differentiation, measures are taken that are required for the type of transmission in question. The measures for different types of transmission also differ from one another. To implement the method, a signaling function can be used that is part of a network transition function and that also has signaling functions for data transmission exclusively within a data transmission network of one type.

In an alternative, the signaling message clearly signals that a unit is involved that transmits data, such as a terminal of a data packet transmission network, or causes data transmission with a terminal of a data packet transmission network. The unit may be a so-called SCP (Signaling Point Control) unit, a so-called SSP (Service Switching Point) unit or a control unit. These units perform an IN (Intelligent Network) service, in which data is transmitted via different types of data transmission networks. The service relates to an automatically established connection between two subscribers of different data transmission networks, for example.

The result achieved by using the method according to the invention is that, particularly in that part of the signaling network in which a signaling method for a circuit-switched data transmission is used, it is possible to signal, in a simple and clear manner, that a terminal of a data packet transmission network or the unit mentioned above is involved in the transmission. Until now, it was not possible to determine with certainty the involvement of such a terminal or such a unit.

In a further development of the method according to the invention, the signaling message meets a standard for signaling in a circuit-switched data transmission network. As a result, the signaling message can also be sent by signaling units or received by signaling units that serve to signal circuit-switched data transmission.

In another further development of the method according to the invention, the signaling message contains an information element with a value that serves for signaling. In contrast to a method in which the signaling message brings about a clear signal simply by its occurrence, implementation of the method is facilitated by means of this measure.

In a next further development of the method according to the invention, the signaling message is a standard signaling message such as that also used in signaling for a data transmission in which the data is exclusively transmitted in a circuit-switched data transmission network. In one embodiment, the information element is transmitted by means of a standard transport mechanism such as that also used in signaling for a data transmission in which the data is transmitted exclusively in a circuit-switched data transmission network. This measure has the result that the part of the signaling network that works according to a signaling method that was originally established only for a circuit-switched data transmission hardly has to be changed at all in order to now carry out signaling both for data transmissions in which data is transmitted only in circuit-switched manner, and signaling in which data is transmitted between a circuit-switched data transmission network and a data packet transmission network, or vice versa.

In one embodiment, the standard mentioned is the ISUP (ISDN User Part) standard, which specifically is formed by Standards Q.761 to Q.765 of the ITU-T (International Telecommunication Union—Telecommunication Standardization Sector). This is because the ISUP standard leaves room for proprietary expansions, so that signaling for a data transmission in data transmission networks of different types can be carried out. For this purpose, Internet addresses and port numbers may be transmitted using the standardized transport mechanism, as well.

In an alternative further development of the method according to the invention, the signaling message is a standard signaling message such as that used in signaling for a data transmission in which the data is transmitted from a circuit-switched data transmission network via a data packet transmission network back to a circuit-switched data transmission network. In one embodiment, the information element is transmitted using a standard transport mechanism, such as that also used in signaling for a data transmission in which the data is transmitted from a circuit-switched data transmission network via a data packet transmission network back to a circuit-switched data transmission network. This measure has the result that units that meet the stated standard hardly have to be changed at all to also carry out signaling for data transmissions in which it is not absolutely necessary that two terminals of a circuit-switched data transmission be involved.

In one embodiment, the stated standard is the BICC (Bearer Independent Call Control) standard, particularly Standards Q.1901 or Q.1902.x of the ITU-T, where x is a natural number greater than 1. Since the assumption in the determinations according to the BICC standard until now has only been that two terminals of a circuit-switched data transmission network are involved in the data transmission, no signaling message has been provided until now to signal the involvement of a terminal located within a data packet transmission network. The further development of the invention therefore closes a gap in the BICC standard; for example, if one terminal is located in a circuit-switched data transmission network and the other terminal is in a data packet transmission network.

In a next further development of the method according to the invention, the information element is structured according to Standard Q.765.5. Standard Q.765.5 of the ITU-T specifically relates to the transport mechanism for ISUP applications or for BICC applications. In particular, the information element according to this standard contains the following, in the following sequence:
an identifier for identifying the information element;
an indication of the length of the information element;
compatibility information;
and information about the value of the information element.

Consistent adherence to this sequence ensures that units from different manufacturers can work together without problems.

In a next further development of the method according to the invention, the information element is transmitted using an IAM message (Initial Address Message) according to the ISUP standard or according to the BICC standard. This means that the information element is transmitted at the beginning of the signaling that is directed from the calling A subscriber to the called B subscriber. Signaling units on the side of the B subscriber are thereby informed early on that a terminal of a data packet transmission network or the unit mentioned above is involved in the data transmission. This information is of particular importance for signaling units that signal according to a signaling method that was originally established for data transmission exclusively within a circuit-switched data transmission network. In particular, this relates to signaling units that perform the network transition function.

In another further development, the information element is transmitted using an APM [sic] message (Application Transport Message) according to the ISUP standard or according to the BICC standard. However, a different message that meets the ISUP standard or the BICC standard can also be used. In one embodiment, the information element is transmitted prior to transmission of the ANM message (Answer Message) according to the ISUP standard or according to the BICC standard. Both the APM message as well as an ACM message (Address Complete Message), or another signaling message directed from the called B subscriber to the calling A subscriber, make it possible to inform signaling units of the involvement of a terminal of a data packet transmission network or the involvement of the unit mentioned above. The ANM message is therefore a particularly important message, because when it arrives the calculation of charges begins, and thereby the transmission of working data is supposed to be possible.

In a next further development of the method according to the invention, a ring tone is generated as a function of the signaling message or also as a function of the content of another signaling message. This is because additional measures for applying a ring tone are required in a case where a network transition function is used for data transmission. Precisely this case, however, can be reliably detected using the method according to the invention. In the case of a data transmission exclusively in the circuit-switched network, the ring tone may only be generated by an end switching center.

In a next further development, the system waits, depending on the signaling message, for the arrival of data that is required for establishing the connection on a higher protocol level of the data packet transmission network. This measure has the result that a defined reaction to the absence of data can be established. An error case is triggered if both the signaling message and the data for establishing the connection on the higher protocol level are missing.

However, the signaling message according to the invention is also used for different applications, for example for the purpose of calculating charges.

The invention also relates to a signaling unit that works according to the method according to the invention or according to a further development. Furthermore, the invention relates to a program, the method according to the invention or a further development being implemented when a processor implements the program. The technical effects mentioned above also apply to the signaling unit and to the program.

Figure 2:
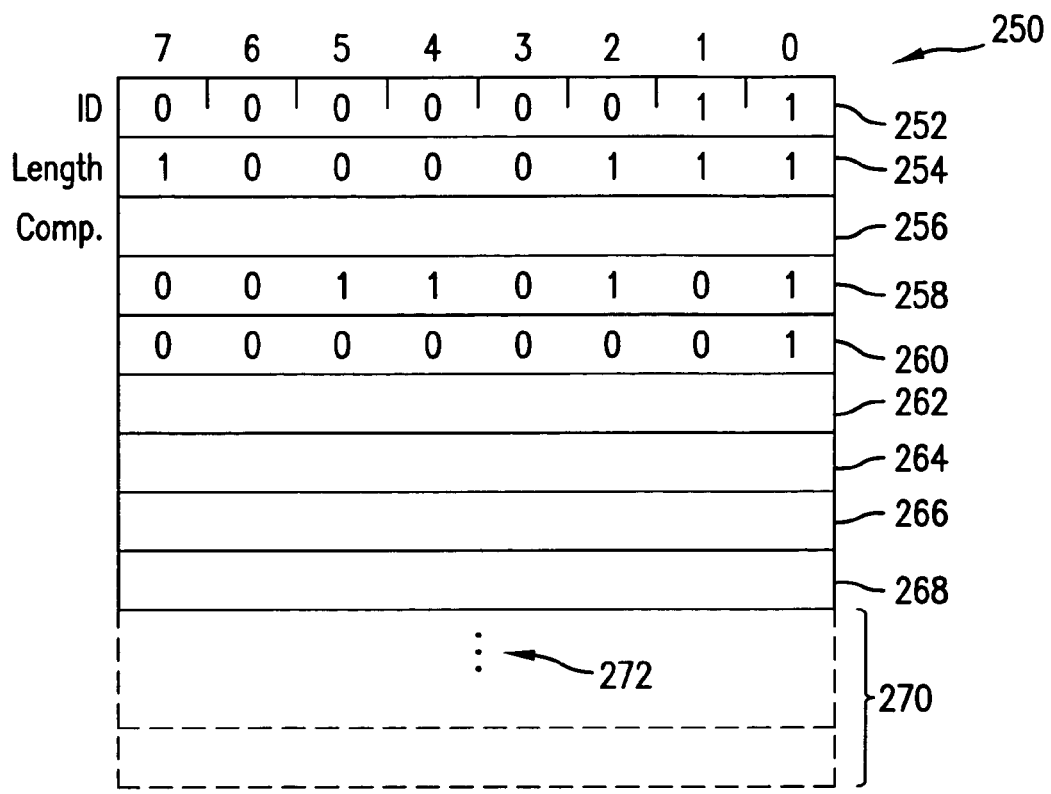
Figure 3:
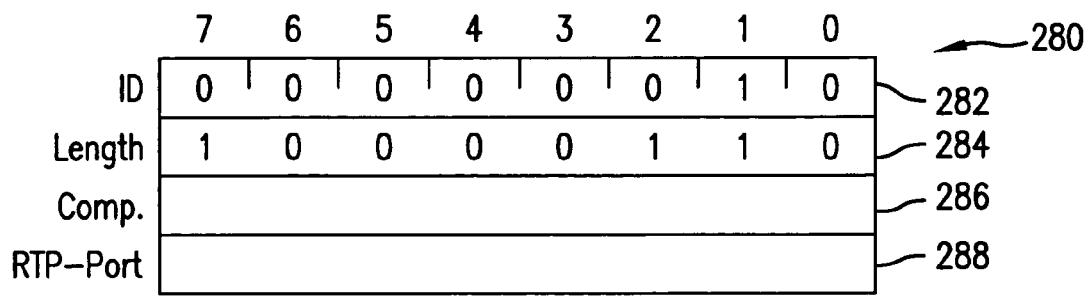
Figure 4:
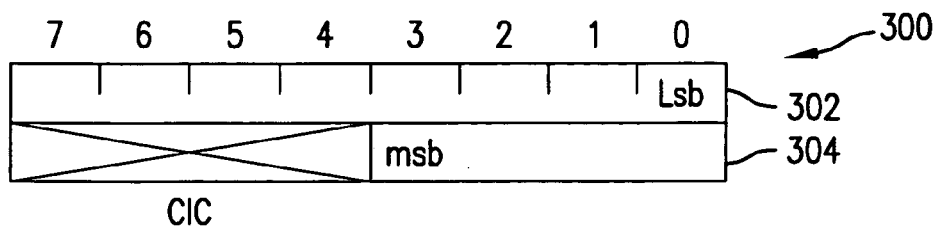
Figure 5:
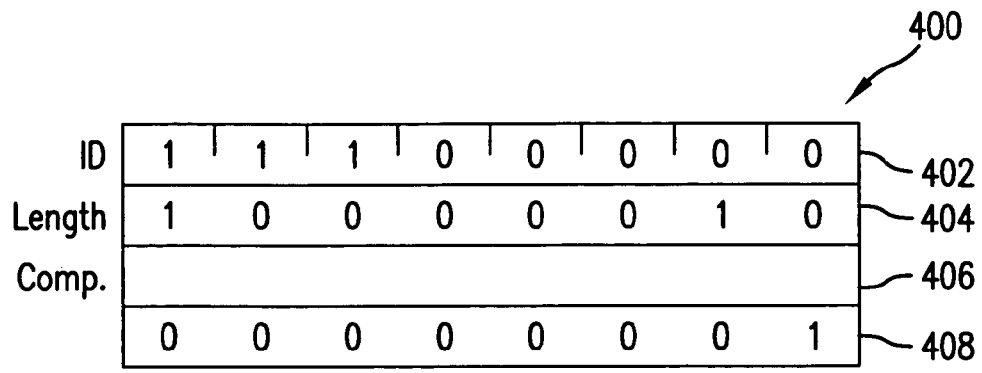
Figure 6:
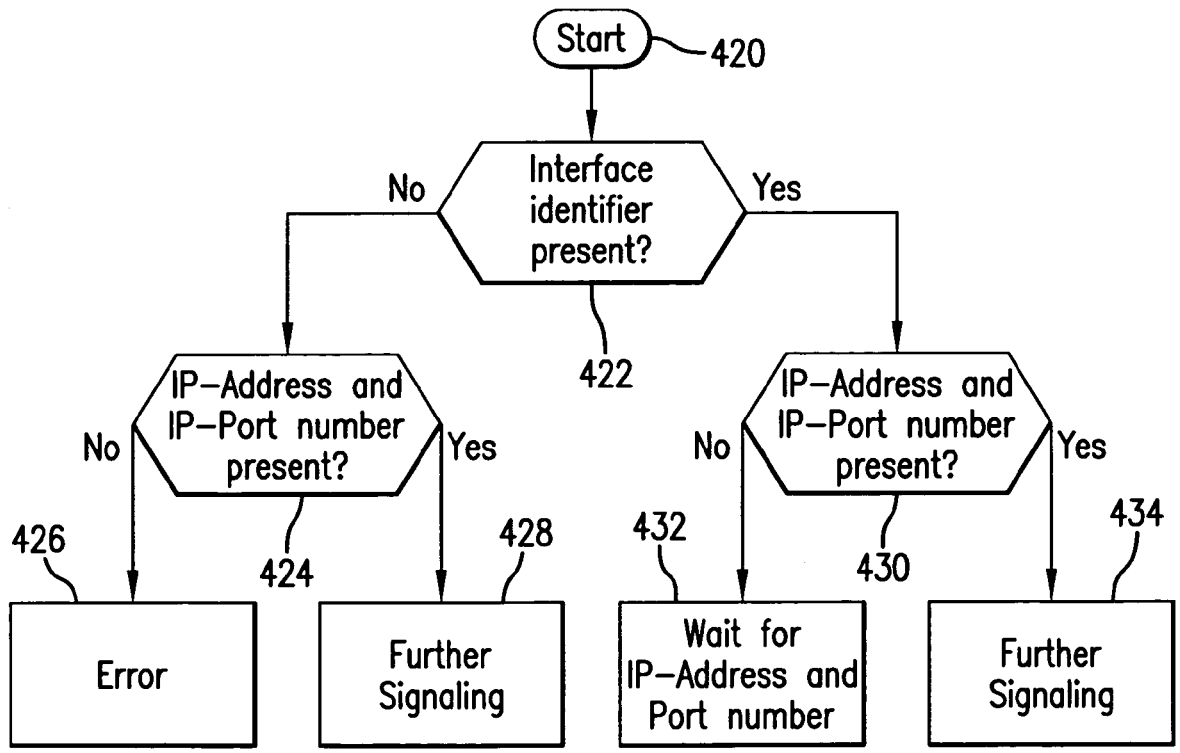

In the following, exemplary embodiments of the invention are explained on the basis of the attached drawings. These show:

FIG. 1 a network transition function that is performed by two spatially separate switching centers and a displaced network transition unit;

FIG. 2 the structure of an information element for transmitting an Internet address;

FIG. 3 the structure of an information element for transmitting an RTP port number;

FIG. 4 the structure of a code element for identifying the calling instance;

FIG. 5 the structure of an information element for signaling the involvement of an H.323 terminal; and FIG. 6 process steps for evaluating the information element according to FIG. 5.

FIG. 1 shows a network transition function 10 between a telephone network 12 and a data packet transmission network 14. The telephone network 12 is, for example, the telephone network of Deutsche Telekom AG. FIG. 1 shows a terminal 16 of a calling subscriber TlnA, an origin switching center 18 and a transit switching center 20 of the telephone network 12. A subscriber connection line 22 is located between the terminal 16 and the origin switching center 18.

The origin switching center 18 is connected with the transit switching center 20 via a PCM-30 transmission segment 24. The call data is transmitted in a time channel, and signaling is performed in accordance with the ISUP protocol. The origin switching center 18 and the transit switching center 20 are, for example, conventional switching centers of the type EWSD from Siemens AG or of the type S12 from Alcatel AG.

A PCM-30 transmission segment 26 for transmitting the working data to a network transition unit 28, which performs part of the network transition function 10, leads from the transit switching center 20. A signaling connection 30 is located between the transit switching center 20 and a switching center 100, which also performs part of the network transition function 10. On the signaling connection 30 signaling takes place according to the ISUP protocol.

The network transition unit 28 takes voice data that is received in a PCM channel of the transmission segment 26, and packages it in data packets that are forwarded to the data packet transmission network 14; for example, via a transmission path 34 that leads to a terminal 36 of a subscriber TlnB, possibly through the Internet. On the other hand, data packets received from the data packet transmission network 14 are unpacked in the network transition unit 28. The working data contained in the data packets are forwarded in a time channel on the PCM-30 transmission segment 26.

The switching center 100 controls the network transition unit 28 using the protocol MGCP (Media Gateway Control Protocol) (see RFC 2705 of the IETF (Internet Engineering Task Force)). The control messages are transmitted via a transmission path 40 that runs through the Internet, for example.

The terminal 36 is a terminal that works according to Standard H.323 of the ITU-T, for example. The terminal 36 has an access unit 44 assigned to it. Between the terminal 36 and the access unit 44, a signaling path 46 can be established, for example via a local data transmission network.

The network transition function 10 is performed by two spatially separated switching centers 100 and 102, as well as by the network transition unit 28. In other words, the network transition function 10 contains a unit that signals according to a signaling method for a circuit-switched network and according to a signaling method for a data packet transmission network, namely the switching center 102 and the service performance computer 118 contained in it. Furthermore, the network transition function 10 contains a unit that transmits the working data both circuit-switched as well as on the basis of data packets, namely the network transition unit 28. Finally, the network transition function 10 also contains a unit for controlling the unit for transmitting the working data, namely the service performance computer 106 contained in the switching center 100.

The following explains signaling messages for establishing a transmission path for transmitting voice data between the subscribers [sic] TlnA and the subscriber TlnB. When establishing the call connection, the switching center 20 generates a connection establishment message 104, also called an IAM message (Initial Address Message), according to the protocol, at a time t1. This message contains the complete telephone number or part of the telephone number of the subscriber TlnB, for example, among other information, and the number of a time slot on the transmission segment 26 to be used for the transmission. The switching center 20 works according to the ISUP standard. On the basis of the telephone number of the subscriber TlnB, the transmission segment 26 is utilized and signaling messages are sent to the switching center 100. The switching center 100 recognizes that the network transition unit 28 is to be included in the connection, based on the so-called CIC (Circuit Identification Code). A service performance computer 106 contained in the switching center 100 is caused by a control unit of the switching center 100 to take the steps necessary to include the network transition unit 28 in the connection.

At a time t2 after the time t1, the service performance computer 106 sends a connection establishment message 108 according to the de facto standard RFC 2705 of the IETF (Internet Engineering Task Force) to the network transition unit 28 via the transmission path 40. The connection establishment message 108 is also referred to as a CRCX (Create Connection) message. The create connection message 108 indicates the time slot that is to be used for the working data transmission. Among other things, the method according to Standard G.711 is indicated as CODEC (coding/decoding) for an RTP (Real Time Protocol) connection to be established. The network transition unit 28 processes the create connection message 108 and generates an answer message 110 as an answer, at a time t3. The answer message 110 confirms receipt of the create connection message 108 and also, among other things, includes an Internet address and a port number that can be used for receiving working data on the transmission path 34 to be established between the network transition unit 28 and the terminal 36. The RTP (Real Time Protocol) is selected as the transmission protocol on the transmission path 34 (see de facto standards RFC 1889 and RFC 1890 of the IETF (Internet Engineering Task Force)).

The service performance computer 106 receives the answer message 110 and forwards the received Internet address as well as the port number to the control unit of the switching center 100. The control unit of the switching center 100 processes the create connection message 104 according to the ISUP protocol, and generates a create connection message 112 at a time t4. The create connection message 112 is also referred to as an IAM (Initial Address Message), according to the ISUP protocol. The create connection message 112 contains two information elements, explained in greater detail below on the basis of FIGS. 2 and 3, in which the Internet address and the port number are forwarded (see item 114). These information elements are not established in the ISUP standard, but are transmitted to the switching center 102, with adherence to this standard, via a signaling connection 116. The information elements are transmitted as an integral part of signaling messages in an APP [sic] (Application Transport Parameter) container according to Standard Q.763 Add. 1 (06/00) and Standard Q.765.5.

The switching center 102 receives the create connection message 112 and also processes the information elements contained in it. Based on the content of these information elements or the code (CIC—Circuit Identification Code) for identifying the calling instance, the system recognizes that it is not a usual telephone connection but rather a telephone connection using the data packet transmission network 14 that is to be established. On the side of the subscriber TlnB, the network access unit 44 is determined to be the network access unit to be used.

The control unit of the switching center 102 causes a service performance computer 118 contained in the switching center 102 to establish an Internet connection to the network access unit 44 via the transmission path 42. At a time t5, the service performance computer 118 sends an ARQ message (Admission Request) (see Standard H.323, particularly section 8.1.2: "Both endpoints registered to the same Gatekeeper," including FIG. 15 of Standard H.323). The ARQ message is processed in the network access unit 44, according to standard procedure. At a time t6, the network access unit generates an ACF message 122, according to standard procedure, which is sent to the service performance computer 118 at a time t6. The network access unit inserts an address into the ACF message 122 that is to be used for subsequent signaling. At a time t7, the service performance computer 118 sends a standard setup message 124 to the address of the network access unit 44a that is contained in the message 122. The setup message 124 contains an information element that indicates a quick start, also called fast start. The Internet address and the port number that were previously received in the switching center 102 are transmitted in an information element of the setup message 124. The stated information elements of the setup message 124 are explained in greater detail in Standard H.225 of the ITU-T, particularly in section 7.3.10.

When processing the setup message 124, the network access unit 44 generates a call-proceeding message 126 for the service performance computer 118, according to the protocol, at a time t8. In addition, the information elements contained in the setup message 124 are taken out and sent to the terminal 36 in a setup message 128 according to the protocol, at a time t9. The setup message 128 also indicates a parameter for the fast start. When the setup message 128 is received in the terminal 36, a call-proceeding message 130 for the network access unit 44 is generated, according to the protocol, at a time t10. The call-proceeding message 130 also contains information for the fast start, namely the Internet address to be used for the RTP transmission path 34a to be established on the side of the terminal 36 as well as the port address to be used. This information is stored for the time being in the network access unit 44.

At a time t11, the terminal 36 sends an ARQ message 132 to obtain approval for the subsequent transmission procedures. This approval is granted at a time t12, using an ACF message according to protocol, by the network access unit 44. After having received the ACF message 134, the terminal 36 sends an alerting message 136 to the network access unit 44 at a time t13, and at the same time generates a signal tone to alert the subscriber TlnB to the incoming call.

When the alerting message 136 is received in the network access unit 44, an alerting message 138 is generated. The alerting message 138 includes the address and the port number transmitted at the time t10 (see broken line 140). The alerting message 138 is sent to the service performance computer 118 by the network access unit 44 at a time t14.

During processing of the alerting message 138, the switching center 102 generates a transport message 142, also referred to as an APM [sic] message (Application Transport Message), according to the ISUP protocol. The transport message 142 contains information elements with the Internet address and the port number of the terminal 36 (see item 144). The information elements have the same structure as the information elements explained below on the basis of FIGS. 2 and 3. In addition, the transport message 142 contains an information element 400 explained below on the basis of FIG. 5, with the value One, which indicates the involvement of a terminal 36 connected to the Internet 14. The transport message 142 is transmitted to the switching center 100 at a time t15.

The control unit of the switching center 100 evaluates the information element 400 and extracts the Internet address and the port number from the transport message 142. Subsequently, the switching center 100 waits for the arrival of a subsequent ACM message 146. Steps for evaluating the data field 408 in the information element 400 are explained below, on the basis of FIG. 6.

Because of the alerting message 138 received at the time t14, the switching center 102 generates an ACM message 146 (Address Complete Message) at a time t16, according to the ISUP standard. A BCI (Backward Call Indicator) parameter of the ACM message 146 has a value that indicates that the subscriber TlnB is not busy. An OBCI (Optional Backward Call Indicator) parameter of the ACM message 146 is given a value that indicates that no ring tone has yet been generated.

The ACM message 146 is processed according to protocol in the switching center 100. Based on the value One in the data field 408 of the information element 400, and based on the values of the BCI and OBCI parameters in the ACM message 146, the control unit causes the service performance computer 106 to have the ring tone switched on in the network transition unit 28. The fact that the ring tone was switched on is also noted in the switching center 100 for the transmission path 34 to be established.

At a time t17, the service performance computer 106 generates a change message 148 according to the de facto standard RFC 2705. The change message 148 is also referred to as an MDCX (Modify Connection) message. The change message 148 contains the Internet address and port number of the terminal 36 transmitted in the transport message 142 for the RTP transmission path 34. In addition, the change message 128 contains a data field with which a request is issued to switch on the ring tone.

During processing of the change message 148 in the network transition unit 28, the time slot on the transmission segment 26 utilized for establishing the connection is assigned to the transmitted target parameters of the terminal 36. In addition, a tone generator is controlled in such a way that a ring tone is sent to the subscriber TlnA, indicating to the latter that the terminal 36 is calling the subscriber TlnB. An answer message generated by the network transition unit 28 in response to the change message 148 is not shown in FIG. 1.

During processing of the ACM message 146, the switching center 100 also generates an ACM message 150, which is sent to the transit switching center 20 at a time t19. The parameter BCI of the ACM message 150 has a value that indicates that the subscriber TlnB is not busy. The OCBI parameter of the ACM message 150 is given a value that indicates that a ring tone is already being generated.

If the subscriber TlnB answers using the terminal 36, the terminal 36 generates a connect message 152 at a time t20 and sends it to the network access unit 44. The network access unit 44 in turn generates a connect message 154, on the basis of the connect message 152, and the former is sent to the service performance computer 118 at a time t21. After having received the connect message 154, the switching center 102 generates an ANM message 156 (Answer Message) as provided according to the ISUP standard. The obligation to pay charges starts on the basis of this message.

The ANM message is processed in the switching center 100. On the basis of the note mentioned above, the switching center 100 checks whether it itself caused the ring tone to be switched on. If it caused the ring tone to be switched on, it controls the service performance computer 106 in such a way that the service performance computer 106 requests that the ring tone be switched off. For this purpose, the service performance computer sends a change message 158 at a time t23, which is also referred to as an MDCX message, according to the de facto standard RFC 2307. The change message 158 contains a data field in which deactivation of the ring tone is requested. When the change message 158 is processed in the network transition unit 28, the tone generator is switched off.

In addition, when the ANM message 156 is processed in the switching center 100, the ANM message 160 provided in the ISUP standard is forwarded to the next switching center, i.e., to the transit switching center 20. Further transmission of the voice data takes place as provided in the ISUP standard or as provided in the standard group for the H.323 standard.

In another exemplary embodiment, the network access unit 44 waits to send the call proceeding message 126 until the call proceeding message 130 has been received from the terminal 36. The Internet address and the port number are then forwarded at the same time as the call proceeding message 126. This makes it possible to send the APM message 142 early on. Instead of the change message 148, two separate change messages are generated, with the second change message serving to switch on the ring tone.

FIG. 1 also shows functional units for controlling the switching center 100 and the switching center 102. The switching center 100 contains a distribution function 162 that works according to Standard Q.704 of the ITU-T. In addition, there is an ISUP module 164 that processes the information elements that are transmitted between the switching centers 100 and 102 for transmitting the Internet addresses and the port numbers. The A-side call control 52 is connected with the ISUP module 164 via an internal signaling protocol 166 of the switching center 100. Between the service performance computer 106 and the A-side call control 52, and between the ISUP module 164 and the service performance computer 106, respectively, messages are exchanged according to the internal signaling protocol 166, as well.

Also, the switching center 102 contains a distribution function 168 that takes over functions established in Standard Q.704 of the ITU-T. The switching center 102 contains an ISUP module 170, as a partner module for the module 164, which processes or generates the information elements that are required for signaling the Internet address and the port number. An internal signaling protocol is utilized between the B-side call control 50 and the ISUP module 170 for exchanging signaling messages, and this protocol, like the internal signaling protocol 166, is very much analogous to the ISUP protocol. The internal signaling protocol 172 also serves to exchange signaling messages between the module 170 and the service performance computer 118, and between the B-side call control 50 and the service performance computer 118, respectively.

FIG. 2 shows the structure of an information element 150 for transmitting an Internet address. In a first exemplary embodiment, the information element 250 contains nine consecutive data fields 252 to 268, each of them having a length of eight bits; i.e., one byte. Bit positions 0 to 7 are located from right to left in this sequence. An identifier for identifying the information element 250 is transmitted in the data field 252. The identifier has the value 3, which serves to indicate a so-called "Interworking Function Address" in Standard Q.765.5, and which indicates here that the information element 250 is serving to transmit an Internet address.

The length of the information element 250, minus the data fields 252 and 254, is indicted in a data field 254. In the exemplary embodiment, the value Seven is stored binary in memory in the data field 254 (see also Standard Q.765.5, section 11.1.1).

Compatibility information is transmitted in the data field 256, with its value indicating to the recipient what must be done if it cannot process the information element 250 completely (see also Standard Q.765.5, section 11.1.1).

In the data field 258, an authorization and format identifier is transmitted, which has the value "35" in the hexadecimal system. This value is used to indicate the Internet protocol, according to Standard X.213 Appendix A of the ITU.

An identifier with the value One is stored in memory in the data field 260 if an Internet address according to Internet Protocol Version 4 is being transmitted. In the subsequent data fields 262 to 268, the four bytes of the Internet address are then transmitted in accordance with Version 4 of the Internet protocol.

If, on the other hand, an Internet address according to Internet Protocol Version 6 is to be transmitted using the information element 250, there is a deviation in the length information (see data field 254) and a deviation in the data field 260. When transmitting Internet addresses according to Internet Protocol Version 6, the value Zero is transmitted in the data field 260. In this case, sixteen data fields 262 to 270 follow the data field 260, in which the sixteen bytes of the Internet address according to Internet Protocol Version 6 are stored in memory (see also item 272).

FIG. 3 shows the structure of an information element 280 for transmitting a port number. The information element 280 contains four data fields 282 to 288, each with a length of one byte. In this sequence, the meaning of the data fields 282 to 286 corresponds to the meaning of the data fields 252 to 256 of the information element 250. The value Two is transmitted in the data field 282 to identify the information element 280 as an information element for transmitting a port number. The identifier transmitted in the data field 282 is referred to as a "backbone network connection identifier" in Standard Q.765.5, in deviation from the function performed here. In a data field 284, the value Two is transmitted as the length of the information element 280, minus the data fields 282 and 284. Information on compatibility is transmitted in the data field 286. Then, the port number, for example the port number to be used for the RTP connection in the network access unit 28 or in the terminal 36, is transmitted in the data field 288 (see FIG. 3).

FIG. 4 shows the structure of a code element 300 that is used for identifying calling instances between the switching centers 100 and 102 (see FIG. 3). The structure of the code element 300 is established in Standard Q.763, section 1.2. The code element 300 contains two data fields 302 and 304, each with a length of one byte. The number of the instance is transmitted starting with the lowest-value bit in the data field 302 (see bit position 0) up to bit position 7 of the data field 302, and then further between bit positions 0 to 3 of the data field 304. The bit positions 4 to 7 of the data field 304 are not used for identifying the instance. The code element 300 has no additional data fields.

FIG. 5 shows the structure of an information element 400 for signaling the involvement of a terminal of a data packet transmission network, namely the terminal 36, in this case. The information element 400 contains four data fields 402 to 408, each with a length of one byte. In this sequence, the meaning of the data fields 402, 404, and 406 corresponds to the meaning of the data fields 252, 254, and 256, respectively, of the information element 250. The data field 402 has the binary value "11100000" and thereby identifies the information element 400 as an information element for signaling the involvement of an IP terminal. The data field 404 has the binary value "10000010" and establishes the number of data fields 406 and 408 that follow the data field 404. The value of the data field 406 is without significance for an explanation of the invention. The data field 408 has the value "00000001" and indicates, with the value One, that a terminal of a data packet transmission network 14 is involved. The data field 408 has the value Zero if no terminal of a data packet transmission network 14 is involved.

FIG. 6 shows process steps for evaluating the information element 400 in the switching center 100. The process begins in a process step 420, after the information element 400 was received in the switching center 100, i.e., after the time t15. In a subsequent process step 422, the system checks whether the data field 408 contains the value One. If this is not the case, a process step 424 follows after the process step 422, in which the system checks whether the Internet address and the port number of the terminal 36 were already transmitted using the APM message 142. If this is not the case, an error message is triggered in a process step 426. If, on the other hand, it is determined in the process step 424 that the Internet address and the port number of the terminal 36 are contained in the APM message 142, a process step 428 follows after the process step 424, in which further signaling takes place as explained above on the basis of FIG. 1.

If, on the other hand, it is determined in the process step 422 that the data field 408 has the value One, the system checks, in a process step 430 that follows immediately, whether the APM message 142 already contains the Internet address and the port number of the terminal 36. If this is not the case, no error message is triggered, and instead, the system waits for later arrival of the Internet address and the port number of the terminal 36 in a process step 432.

If, on the other hand, it is determined in the process step 430 that the Internet address and the port number of the terminal 36 are already known in the switching center 100 (see explanations concerning FIG. 1), signaling continues in accordance with the process steps explained on the basis of FIG. 1 (see process step 434).

In another exemplary embodiment, the Internet address and the port number are only forwarded to the network transition unit 44 with the connect message 152. The address information is integrated into the connect message 154 and transmitted to the switching center 102. The APM message 142, the ACM message 146 and the ANM message 156 are not sent until after the connect message 154 arrives. The other process steps remain unchanged.

In another exemplary embodiment, the call controls 50 and 52 are housed in the same switching center. In addition, the two service performance computers 106 and 118 are built into the same switching center. There is only one internal signaling protocol 166 in the switching center. Instead of the messages 112, 142, 146 or 156, internal messages similar to these messages are exchanged between the call control 50 and the call control 52 using the internal signaling protocol 166. In particular, the information element 400 is also transmitted with an internal message. For the remainder, the process steps explained above on the basis of FIG. 1 apply.

In another exemplary embodiment, the network transition unit 28 is also contained in the switching center 100. In this case, the internal signaling protocol 166 of the switching center 100 is also used for transmitting messages between the service performance computer 106 and the network transition unit 28.

In a next exemplary embodiment, the protocol SIP (Session Invocation Protocol) according to RFC 2543 or another suitable protocol is used in place of the protocol of the protocol family H.323 between the units 36, 44 and 118, shown on the right side of FIG. 1.

In place of the data packet transmission network 14 that works according to the Internet protocol, an ATM network is used in another embodiment. In this case, the protocol BICC from Standard Q.1901 of the ITU-T is used for signaling between the switching centers 100 and 102. But the protocol BICC can also be used in an IP network (see Q.1902.x and Q.765.5 Amendment 1).

In place of the protocol RFC 2705 (Request For Comment) "MGCP—Media Gateway Control Protocol" used in the explanation of FIG. 1, in another exemplary embodiment the protocol H.248 of the ITU-T or the protocol CBC (Call Bearer Control) of the ITU-T is used, particularly protocols in accordance with Standards Q.1950, Q.1970 and Q.1990 of the ITU-T.

Of course, values can be used in the information elements that differ from the values explained on the basis of FIGS. 2 to 5.

In another exemplary embodiment, the information element 400 is only sent with the ACM message 146, or with an APM message that is transmitted after the time t16 but still before the time t22, between the switching center 102 and the switching center 100. However, the ACM message 146 arrives in the switching center 100 before a timer that establishes a waiting time for arrival of the connection data has run out. The timer is started, for example, when it is determined that the transport message 142 does not contain any connection data.

In a next exemplary embodiment, the H.323 terminal is the calling terminal and the terminal 16, i.e., the telephone, is the called terminal. In this case, the information element 400 is already transmitted with a create connection message transmitted from the switching center 102 to the switching center 100, i.e., with an IAM message, to signal early on the involvement of the terminal 36. Accordingly, the connection data does not yet have to be transmitted in this IAM message, either.

[See Original for Figures]

FIG. 1
Verteiler=Distributor
Rufton an=Ring tone on
Rufton aus=Ring tone off
VSt=Vermittlungsstelle=Switching center
IP-Netz=IP network FIG. 2
Länge=Length
Komp.=Comp.

FIG. 3

[See FIG. 2 Translations]

FIG. 4

FIG. 5

[See FIG. 2 Translations]

FIG. 6
Schnittstellen . . . ?=Interface identifier present?
Nein=No
Ja=Yes
IP-Adresse . . . ?=IP address and IP port number present?
Fehlerfall=Error
weitere . . . =further signaling
warten . . . =wait for IP address and port number

The invention claimed is:

1. A signaling method for transmitting working data in different types of data transmission networks, in which working data is transmitted between a circuit-switched data transmission network and a data packet transmission network, comprising:

transmitting a signaling message that indicates that a data transmission with a terminal of a data packet transmission network is involved in the data transmission;

examining whether a data field of the signaling message contains an indication that the terminal is part of the data packet transmission network;

if the data field contains no indication, determining whether the signaling message contains an address of a frame transmission net; and if the signaling message contains an address of the data packet transmission network, determining that the terminal is part of a data packet network, wherein the transmission of data between the circuit-switched data transmission network and the data packet transmission network is differentiated from other data transmissions, depending on the content or as a result of the occurrence of the signaling message.

2. The method according to claim 1, wherein the signaling message meets a standard for signaling in a circuit-switched data transmission network.

3. The method according to claim 1, wherein the signaling message contains an information element having a value which serves for signaling.

4. The method according to claim 3, wherein at least one of the signaling message is a standard signaling message used for signaling for data transmission in which the data is transmitted exclusively in a circuit-switched data transmission network, and the information element is transmitted using a standard transport mechanism used in signaling for data transmission in which the data is transmitted exclusively in a circuit-switched data transmission network, is met.

5. The method according to claim 4, wherein the ISUP standard or a standard based on the ISUP standard is met.

6. The method according to claim 3, wherein at least one of the signaling message is a standard signaling message used in signaling for data transmission in which the data is transmitted from a circuit-switched data transmission network via a data packet transmission network to a circuit-switched data transmission network, and the information element is transmitted by a standard transport mechanism used in signaling for data transmission in which the data is transmitted from a circuit-switched data transmission network via a data packet transmission network to a circuit-switched data transmission network, is met.

7. The method according to claim 6, wherein the BICC standard or a standard based on the BICC standard is met.

8. The method according to claim 3, wherein at least one of the information element is structured according to Standard Q.765.5, and the information element contains the following, in the following sequence, an identifier for identifying the information element, an indication of a length of the information element, compatibility information, and information about the value of the information element, is met.

9. The method according to claim 3, wherein the information element is transmitted using an IAM message according to the ISUP standard or according to the BICC standard or according to a standard based on one of these standards, or the information element is transmitted by at least one of using an APM message and before the transmission of an ANM message according to the ISUP standard or according to the BICC standard or according to a standard based on one of these standards.

10. The method according to claim 1, wherein a ring tone is generated as a function of the signaling message or both as a function of the signaling message and as a function of the content of another signaling message.

11. The method according to claim 1, wherein a system waits for the arrival of data that is required for establishing a connection on a higher protocol level of the data packet transmission network, as a function of the signaling message.

12. The method according to claim 1, wherein at least one of the circuit-switched data transmission network is a telephone network and the data packet transmission network is a network that works according to the Internet protocol or a network that works according to the ATM protocol, is met.

13. A network transition unit, with a control unit comprising:

a control unit that detects a signaling message that indicates that a data transmission with a terminal of a data packet transmission network is involved in the data transmission, wherein the control unit examines whether a data field of the signaling message contains an indication that the terminal is part of a data packet transmission network, in the case that the data field contains no indication, the control unit examines whether the signaling message contains an address of a frame transmission net, in the case that the signaling message contains an address of the data packet transmission network, the control unit decides that the terminal is part of a data packet network.

14. A computer program embedded on a computer readable medium for determining that a transmitted signaling message indicates that a data transmission with a terminal of a data packet transmission network is involved in the data transmission, the program executing the steps of:

examining whether a data field of the signaling message contains an indication that the terminal is part of a data packet transmission network, in the case that the data field contains no indication, determining whether the signaling message contains an address of a frame transmission net, in the case that the signaling message contains an address of the data packet transmission network, deciding that the terminal is part of a data packet network, and the transmission of data between the circuit-switched data transmission network and the data packet transmission network is differentiated from other data transmissions, depending on the content or as a result of the occurrence of the signaling message.

* * * * *